(12) United States Patent
Hardy et al.

(10) Patent No.: US 6,286,784 B1
(45) Date of Patent: Sep. 11, 2001

(54) AUTOMATIC RESTOW SYSTEM FOR AIRCRAFT THRUST REVERSER

(75) Inventors: Brant B. Hardy, Kent, WA (US); Joe E. Sternberger, Wichita; Gregory S. Hills, Derby, both of KS (US); Kurt R. Kraft, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/527,790

(22) Filed: Mar. 17, 2000

Related U.S. Application Data

(62) Division of application No. 08/961,576, filed on Oct. 31, 1997, now Pat. No. 6,042,053.

(51) Int. Cl.$^7$ ..................................................... F02K 1/32
(52) U.S. Cl. .................................. 244/110 B; 239/265.19; 60/226.2
(58) Field of Search ................... 244/110 B; 239/265.19, 239/265.29; 60/226.2, 39.091; 91/166, 416

(56) References Cited

U.S. PATENT DOCUMENTS

| | | | |
|---|---|---|---|
| 3,961,560 | 6/1976 | Bader | 359/91 |
| 4,424,669 | * 1/1984 | Fage | 244/110 B |
| 4,437,783 | 3/1984 | Halin et al. | 403/27 |
| 4,543,783 | * 10/1985 | Greune et al. | 60/226.2 |
| 4,579,039 | * 4/1986 | Ebbing | 91/166 |
| 4,761,949 | * 8/1988 | Leclercq | 60/226.2 |
| 4,827,248 | * 5/1989 | Crudden et al. | 244/110 B |
| 5,280,704 | * 1/1994 | Anderson et al. | 239/265.19 |
| 5,381,654 | 1/1995 | Halin | 60/22.6 |
| 5,547,130 | * 8/1996 | Davies | 239/265.29 |
| 5,735,557 | * 4/1998 | Harvey | 244/110 B |
| 5,862,823 | * 10/1998 | Lymons et al. | 244/110 B |

OTHER PUBLICATIONS

"Proximity Sensing Components & Systems For Flight Controls", Crane Eldec Corporation, Lynnwood, Washington.
Dowty Aerospace Los Angeles, Part No. 1U525 one page, Mar. 1995.*

* cited by examiner

Primary Examiner—Galen L. Barefoot

(57) ABSTRACT

An actuation activation system for an aircraft engine thrust reverser system is provided including an improved locking actuator (29), a sleeve sensor mechanism, and auto-restow control logic. The locking actuator (29) includes a lever (57) corresponding to whether the actuator is locked or unlocked. A slide-by first proximity sensor (45) is positioned near the lever and set to normally far and triggering near. The first proximity sensor produces a first trigger signal for use in the auto-restow control logic. The sensor mechanism includes a second slide-by proximity sensor and a target in communication with a thrust reverser translating sleeve. The second sensor is connected to the forward side of an engine torque box. A preferred embodiment sensor mechanism (78) is provided and includes a pivotable target arm (96) having a proximal end (98), a distal end (100), and a middle portion pivotably connected to fixed engine structure, preferably torque box (30). The mechanism (78) includes a proximity sensor (94) connected to the torque box (30) at a location near the target arm distal end (100). The sensor (94) is set to normally far, triggering near. Rotation of the target arm causes its distal end to become positioned in front of the proximity sensor switch. The auto-restow control logic is in communication with the first and second proximity sensors. The logic commands the thrust reversers system to restow upon receipt of a trigger signal from either the first or the second proximity sensors. An improved locking actuator is provided including a lead screw nut (70) having a shoulder (77) that provides a secondary locking mechanism for the actuator piston (50).

9 Claims, 10 Drawing Sheets

AUTOMATIC RESTOW SYSTEM FOR AIRCRAFT THRUST REVERSER

CROSS-REFERENCE TO RELATED APPLICATIONS

This is a divisional of Ser. No. 08/961,576, filed Oct. 31, 1997, allowed now U.S. Pat. No. 6,042,053.

FIELD OF THE INVENTION

The present invention relates to airplane thrust reverser control systems, and more particularly to thrust reverser control systems for avoiding uncommanded thrust reverser deployment.

BACKGROUND OF THE INVENTION

Airplane thrust reversers come in a variety of designs depending on the engine manufacturer, the engine configuration, and the propulsion technology being utilized. Thrust reversers for turbofan engines 10 such as the one shown in FIG. 1 are typically reversed in three ways. Cascade-type thrust reversers are located at an engine's midsection and redirect fan flow air 18 through cascade vanes 16 positioned on the engine periphery. Cascade-type reversers are normally used on high-bypass ratio engines. Target-type thrust reversers, sometimes called clamshell reversers, utilize two doors to block the entire jet efflux. These doors are in the aft portion of the engine and form the rear part of the nacelle. Target reversers are typically used with low-bypass ratio engines. Pivot door thrust reversers are similar to cascade-type thrust reversers except that no cascade vanes are provided. Instead, four doors on the engine nacelle blossom outward to redirect flow.

A cascade-type thrust reverser works as follows. Referring to FIG. 2, an engine fan case 12 includes a pair of semi-circular thrust reverser translating sleeves 14 (sometimes called cowls) that are positioned circumferentially on the outside of the fan case 12 and that cover a plurality of cascade vanes 16 (i.e., non-rearwardly facing air vents.) The cascade vanes 16 are positioned between the thrust reverser sleeves 14 and the bypass air flow path 18. Referring to FIGS. 2 and 3, series of blocker doors 20 are mechanically linked to the thrust reverser sleeves 14 via a drag link 22 rotatably connected to an inner wall 24 that surrounds the engine case 26. In their stowed position, the blocker doors 20 form a portion of the inner wall and are therefore oriented parallel to fan air 18 flow. When the thrust reversers are activated, the thrust reverser sleeves 14 translate aft, causing the blocker doors 20 to rotate into a deployed position in which they block the fan air flow passage. This also causes the cascade vanes 16 to be exposed and the fan air 18 to be redirected out the cascade vanes. The re-direction of fan air 18 in a forward direction works to slow the airplane.

Still referring to FIG. 3, the thrust reverser sleeves 14 are operated by one or more hydraulic actuators 28 per engine. The actuators 28 are attached between a stationary torque box 30 and the translating sleeve. The actuators 28 interconnect with each other via a synchronization mechanism, such as a flexible shaft 32. The synchronization mechanism ensures that the actuators move at the same rate. The torque box 30 also provides structural support for the synchronization mechanism and the cascade vanes 16. As shown in FIG. 2, the torque box is typically formed as a pair of rigid semicircular beams located at the forward end of the fan case 12 (i.e., just forward of the cascade vanes.)

An actuation activation system translates the thrust reverser sleeves 14 from a locked and stowed position to an unlocked and translated position for reverse thrust. Due to significant physical forces present during flight that can work to push the translating sleeve 14 to an open position, current actuation systems include a number of ways of preventing uncommanded translation. For example, it is known to provide actuators that are capable of locking in order to retain the thrust reverser sleeve in the stow position. Or, an electrically-operated synchronization shaft lock 34 may be provided to control synchronization shaft movement. It is also known to provide automatic restow capability in which dedicated system control logic automatically causes the actuators 28 to stow the thrust reverser during detection of rearward movement of the sleeves 14.

One known auto-restow arrangement is described below with reference to FIG. 4. In this arrangement, two electric proximity sensors 36, 38 are mounted to the aft side of the torque box 30 and are facing rearward. Two spring-loaded targets 40, 42 are affixed to the translating sleeve 14. The sensors 36, 38 are targeted to a "normally near" condition (i.e., they are adjusted to expect under normal conditions the return signal from their target to be from a particular pre-defined "near" distance.) One of these sensors 36 is used for locating the position of the translating sleeve. The other sensor 38 is used for sleeve control by indicating an unlocked thrust reverser condition to the actuation activation system.

When the translating sleeve 14 is stowed for normal engine forward thrust, the targets 40, 42 are sensed by the sensors 36, 38 and the auto restow control logic is not accessed. If the sleeve moves aft, either powered or unpowered, the targets 40, 42 move away from the sensors 36, 38. This causes the distance between the sensors and the targets to increase and the sensors to trigger. Upon triggering, the sensors 36, 38 send a signal to the actuation activation system which energizes the auto restow control logic which immediately attempts to restow the thrust reversers. The autorestow system is activated only when both targets are triggered by translation of the sleeve. This is referred to as 'AND' logic 44 and is shown in FIG. 7A.

During normal operations, the sleeve 14 moves relative to the torque box 30 because of aerodynamic loads, vibrations, and relative motion between the engine and nacelle structures. Relative motion, however, can result in the targets being sensed in the "far" condition, which in turn trips one or both sensors 36, 38 and energizes the auto restow function, even though the sleeve is in fact still in its stowed and locked position.

Another undesirable aspect of this arrangement is that it is difficult and time consuming to position the sensors and target. To ensure proper detection of the target by the sensor, a specific required distance must be present between the sensors 36, 38 and the targets 40, 42. Prior to use, a mechanic must adjust the distance until it is within an acceptable range of values. This is done by using an iterative process, since the proximity sensor and target are covered by the translating sleeve 14. In particular, a mechanic must repeatedly test and readjust the location of the target until the required distance is obtained. Typically, the mechanic applies clay or other deformable substance to either the target (or the sensor.) The mechanic then closes and reopens the sleeve. The mechanic measures the resulting thickness of clay. Using this information, the mechanic calculates an adjustment to the position of the target. After the adjustment is made and more clay is added, the sleeve is once again closed and reopened. The mechanic again checks the clay thickness to see if the proper distance has been attained. If not, the process is repeated until it is within acceptable limits. As can be appreciated, this is a very labor intensive and cumbersome process.

Thus, a need exists for an improved actuation activation system in which the thrust reverser is automatically restowed. The ideal system would be easy to install and easy to calibrate without requiring labor intensive and time consuming distancing steps. The present invention is directed to fulfilling this need.

SUMMARY OF THE INVENTION

In accordance with aspects of the present invention, an aircraft engine thrust reverser actuation activation system is provided for use with an aircraft thrust reverser system having stowed and extended positions. The system includes at least one locking actuator for moving a thrust reverser translating sleeve. The locking actuator has locked and unlocked states corresponding to the thrust reverser system stowed and extended positions, respectively. The locking actuator includes a slide-by first sensor capable of producing a first trigger signal when the actuator is in its unlocked position. The first sensor is targeted to normally far and triggering near. A sleeve sensor mechanism is provided and includes a second proximity sensor switch set to produce a second trigger signal upon detection of appreciable movement of the translating sleeve.

An auto-restow control system is further provided and is in communication with the first and second proximity sensors switches and the thrust reverser system moving components. The auto-restow system causes the restowing of the moving components upon receipt of a trigger signal from either of the first and second proximity sensor switches.

In accordance with other aspects of this invention, a preferred locking actuator is provided that includes a housing and a lever having locked and unlocked positions. A proximity sensor is connected to the actuator housing at a location near the lever. When the lever moves to its unlocked position, it triggers the proximity sensor to produce an output signal. The proximity sensor is preferably targeted-to normally far and triggering near. Thus, in an unlocked position, the lever is positioned in front of the first proximity sensor switch to thus cause the first proximity sensor switch to produce the first trigger signal.

In accordance with further aspects of this invention, an improvement is provided to a locking actuator having at least one lock key, a locking sleeve, a piston, a lead screw, and a lead screw nut attached to the piston and rotatably connected to the lead screw. The lead screw nut is cylindrical. At least one key is disposed between the sleeve and the piston when the actuator is in a locked state. The improvement includes a shoulder extending radially outward from the lead screw nut first end. During a locked position with a failure of the piston, the shoulder engages at least one lock key in order to keep the actuator in its locked position. In preferred embodiments, the should engages a key through either direct contact or by jamming a portion of the piston against the key.

In accordance with still other aspects of this invention, a sensor mechanism for determining movement of an aircraft thrust reverser system is provided. The sensor mechanism includes a proximity sensor and a target and the aircraft thrust reverser system includes a torque box and a translating sleeve substantially positioned aft of the torque box. The proximity sensor is positioned forward of the torque box and set to normally far and triggering near. The target is adapted to be in operable communication with the aircraft thrust reverser system via a hole in the engine torque box. Movement of the translating sleeve causes the target to slide by the sensor to trigger the sensor.

In accordance with still further aspects of this invention, the sensor mechanism includes a plunger connected to a thrust reverser translating sleeve. During a stowed condition, the plunger extends through the hole in the torque box to position the target away from the proximity sensor. Aft movement of the translating sleeve and plunger causes the target to move in front of, and thus trigger, the proximity sensor. In preferred embodiments, the sensor mechanism includes pivotably mounting the target to a forward surface of the torque box and positioning the plunger so that during the stowed position the plunger pivots the target away from the proximity sensor and during the extended position the plunger moves the target in front of the proximity sensor.

In accordance with yet other aspects of this invention, a sensor mechanism is provided including a target arm with a proximal end, a distal end, and a middle portion rotatably connected to fixed engine structure, such as a torque box. The target arm is also in contact with the translating sleeve. A proximity sensor is connected to the fixed structure at a location near the target arm distal end and set to normally far. Translation of the sleeve causes the target arm to pivot about its rotatable connection to the fixed engine portion. During translation, one of the target arm distal and proximal ends becomes positioned in front of the proximity sensor, thereby causing the switch to produce a trigger signal. In a preferred embodiment, a target plate is connected to the target arm distal end.

In accordance with yet further aspects of this invention, the sleeve sensor mechanism includes a spring arranged to urge the target arm in front of the second proximity sensor. When stowed, a portion of the translating sleeve urges the target arm away from the second proximity sensor. In preferred embodiments, the target arm rotatable connection includes a pivot bolt. The spring is wound about the pivot bolt to urge the target arm to rotate in a direction that causes the arm distal end to move in front of the second sensor. A plunger is attached to the translating sleeve to urge the target arm to rotate in an opposite direction.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As will be better understood from the following description, the present invention is a system of automatically restowing airplane thrust reversers during certain inflight circumstances. The present invention is ideally suited for use with hydraulically-controlled cascade-type thrust reversers. While ideally suited and described below with reference to such reversers, it is to be understood that the present invention may be adapted for use with other thrust reverser systems that are hydraulically controlled and that include one or more translating thrust reverser components.

The present invention includes four aspects. The first and second aspects are improvements to known locking actuators and are presented with reference to FIGS. 5A–6B. The third aspect is a sleeve sensor mechanism located between engine fixed structure and the thrust reverser translating sleeve 14. This feature is discussed with reference to FIGS. 7A–7D. The fourth aspect is an improvement to an auto-restow control logic for use in a thrust reverser activation actuation system. The fourth aspect is discussed with reference to FIGS. 8A and 8B.

Referring generally to FIGS. 5A–6B is an improved locking actuator 29. The improvements described below include the addition of a proximity sensor 45 and target 46 to the actuator to accurately reflect the locked or unlocked state of the actuator and improvements to an internal lead nut screw for providing dual load paths. It is to be understood that these features may be practiced on other configurations of locking actuators. The actuator used in the description below is therefore meant to be illustrative and not limiting.

Figure 1:
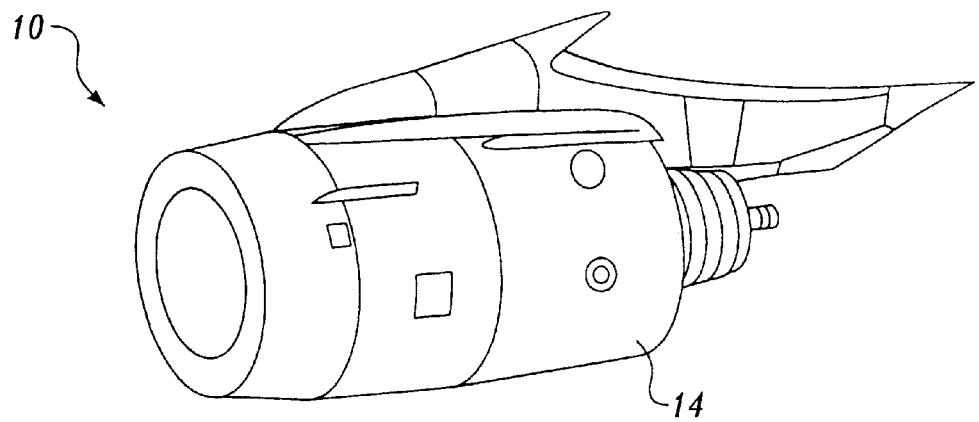
FIG. 1 is a perspective view of a prior art aircraft engine.
Figure 2:
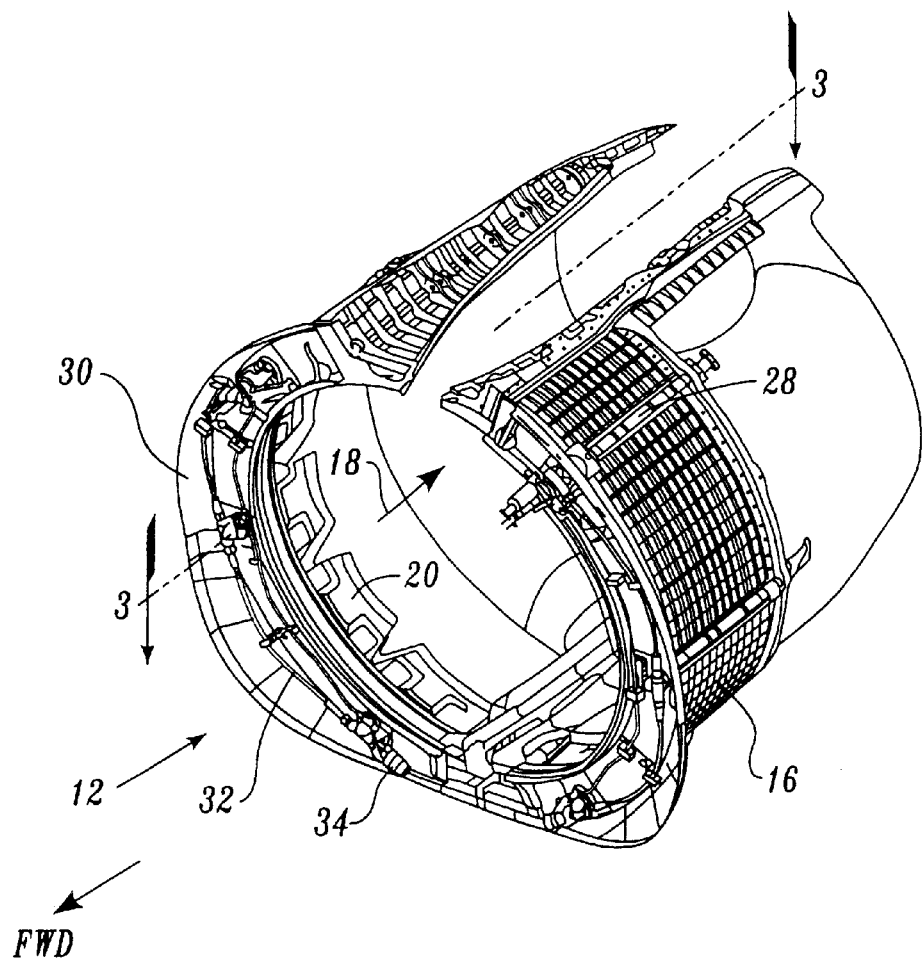
FIG. 2 is a perspective view of portions of a fan cowl used with the engine of FIG. 1.
Figure 3:
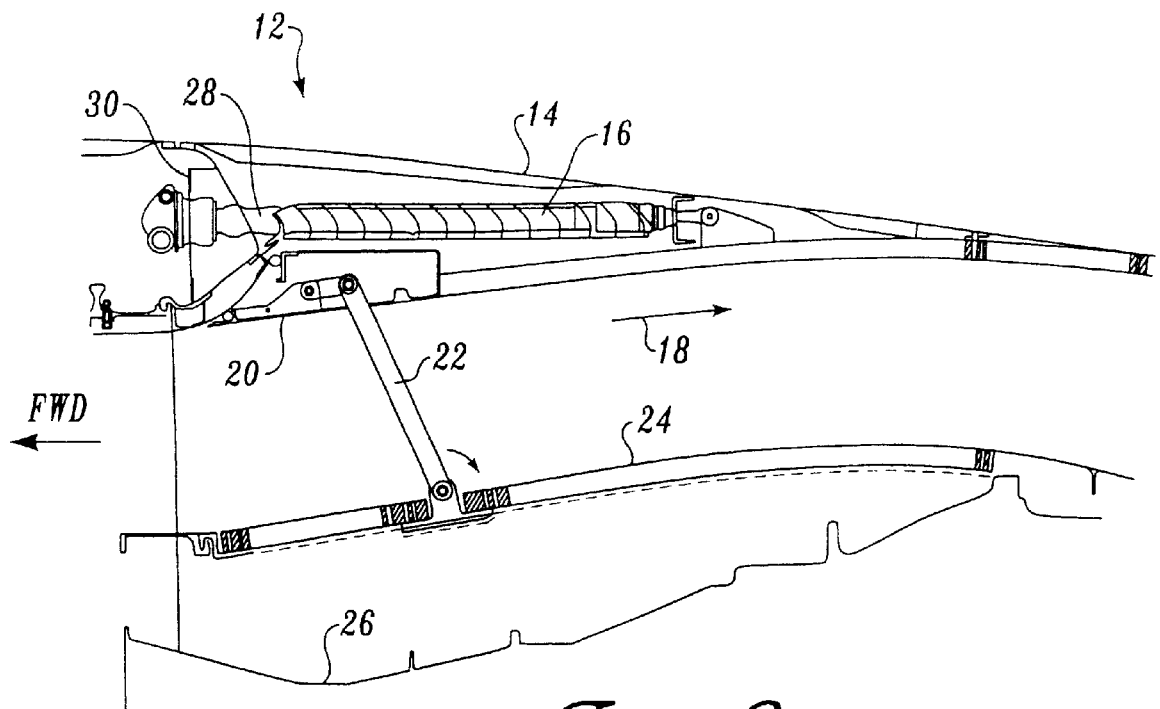
FIG. 3 is a cross-sectional view of the fan airflow path and translating sleeve used with the engine of FIG. 1.
Figure 4:
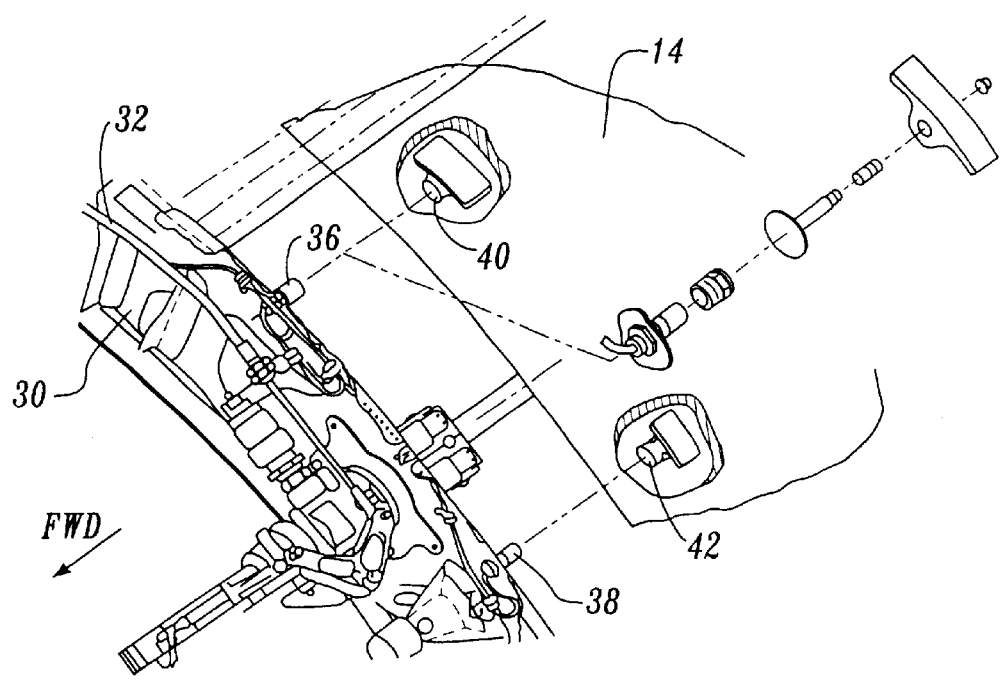
FIG. 4 is a partial cutaway detail perspective view of the fan cowl of FIG. 2, the view is taken from the exterior of the cowl looking slightly aft.
Figure 5A:
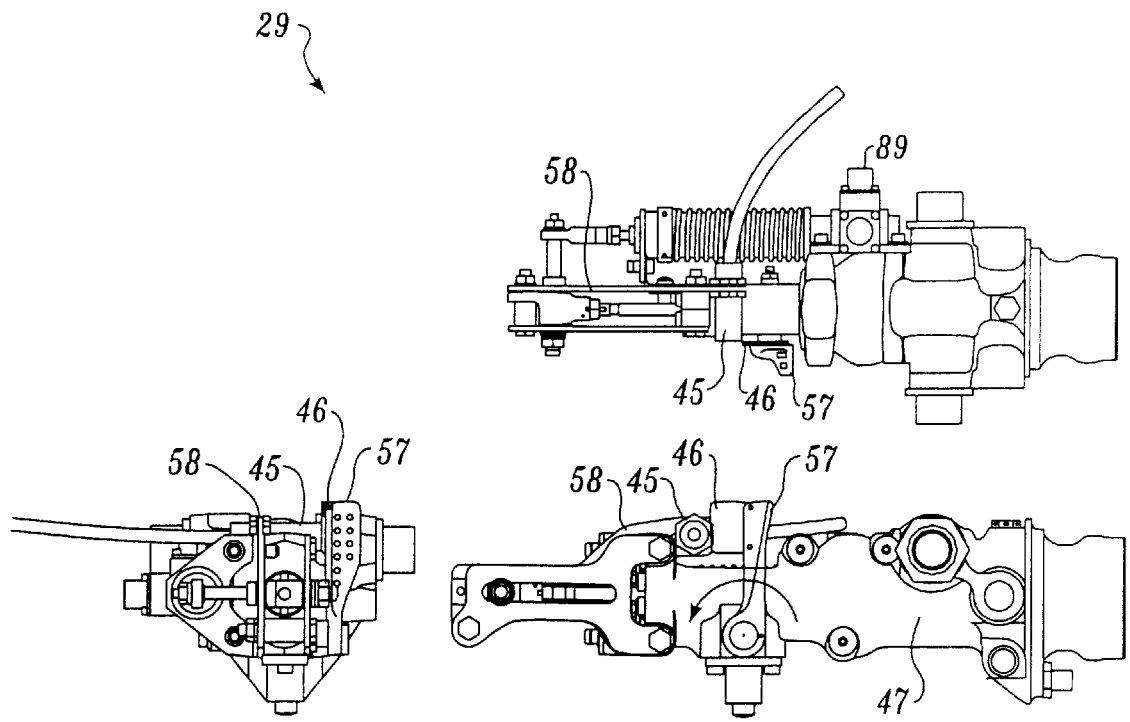
FIG. 5A shows end, side, and top down views of a locking actuator formed in accordance with the present invention, the views showing the actuator in a locked position.
Figure 5B:
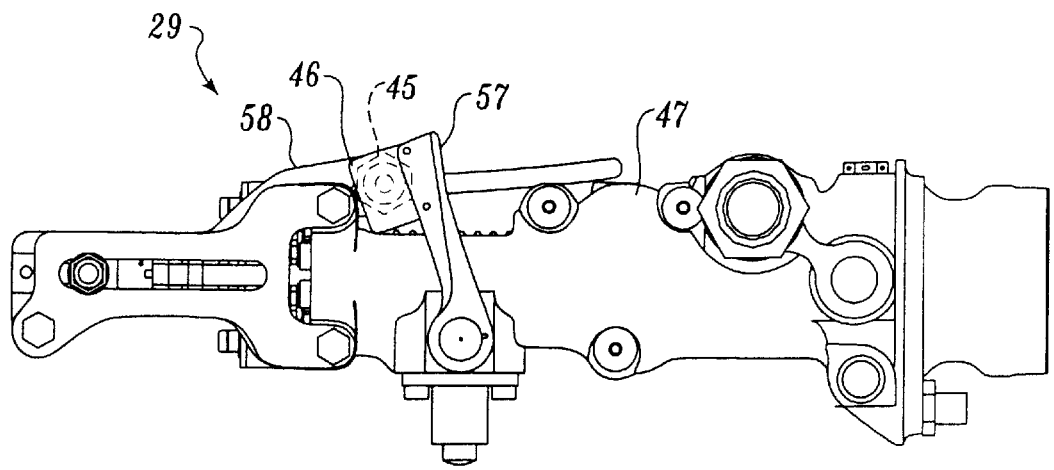
FIG. 5B is a side view of the actuator of FIG. 5A showing the actuator in an unlocked position.
Figure 5C:
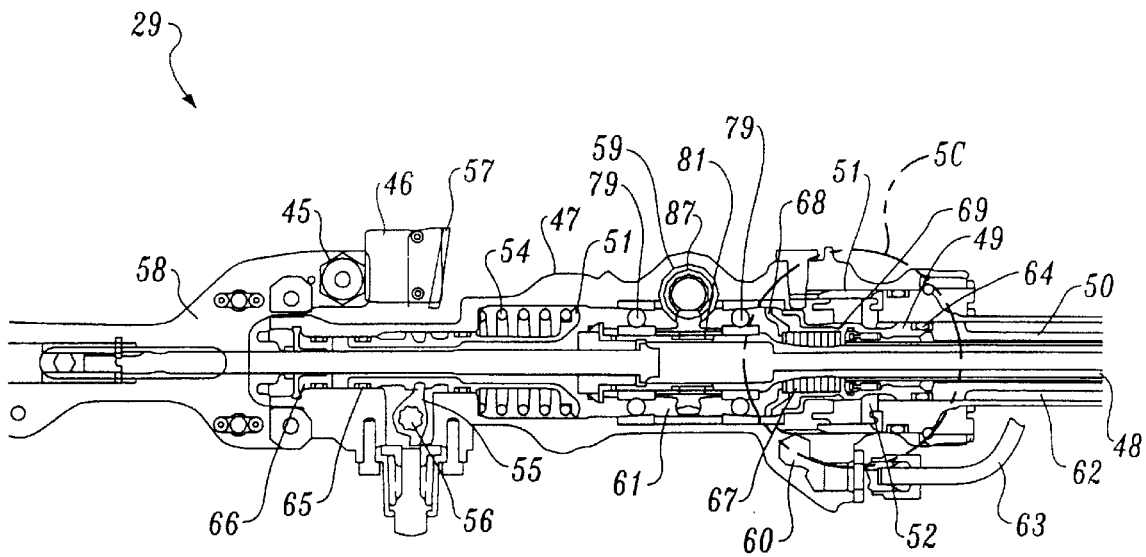
FIGS. 5C and 5D are cross-sectional side and detail views respectively of the actuator of FIG. 5A.
Figure 5D:
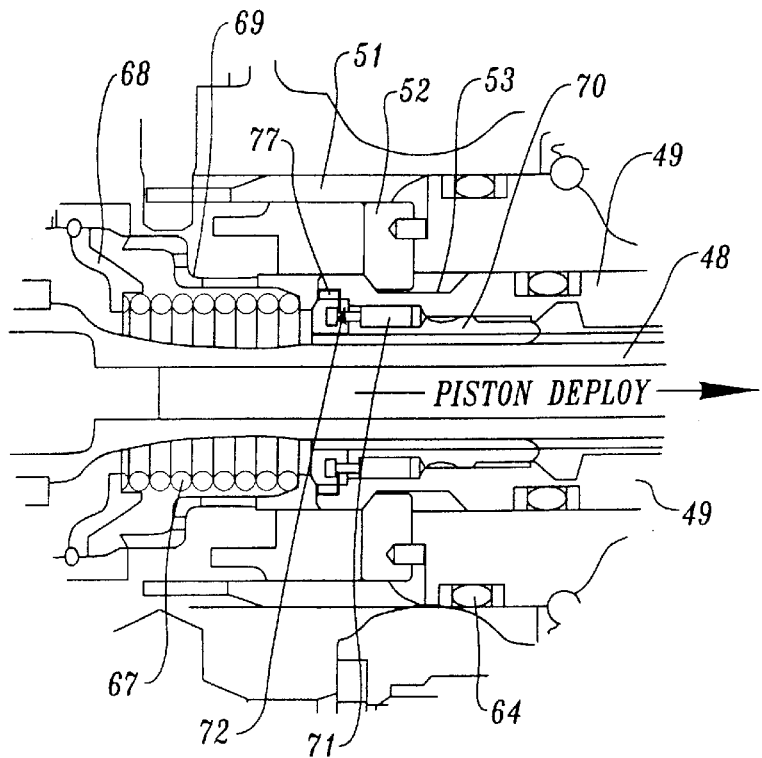

Shown FIGS. 5A, 5C, and 5D are various views of the locking actuator 29 in a stowed or locked position. FIG. 5B illustrates the actuator in an extended or unlocked position. The actuator includes an elongated housing 47 with a lead screw 48 extending from one end. Referring to FIG. 5C, in the locked position, the head 49 of a cylindrical piston 50 is held relative to a lock sleeve 51 via a number of lock keys 52. The lock keys 52 extend into corresponding slots 53 in the piston head 49 (see FIG. 5D.) The keys are held therein by action of a lock spring 54 that continuously urges the sleeve 51 over the keys 52 to push the keys into the piston head slots 53.

A lock tooth 55 engages the lock sleeve 51 and is attached via a splined shaft 56 to a manual unlock lever 57. The shaft 56 extends through the housing 47 so that the lever 57 is located near the housing exterior. The manual unlock lever 57 supports an unlock target 46. A proximity sensor 45 is attached to the housing using a stop bracket 58. The sensor 45 is set to normally far. Referring to FIG. 5C, when the actuator 29 is locked, the unlock lever 57 is in an upright locked position. In this position, the target 46 is positioned away from the proximity sensor 45, thus the sensor is not activated by the target.

Referring to FIG. 5B, when the lever 57 is moved to an unlocked position, the target 46 becomes positioned directly in front of the proximity sensor 45. The nearness of the target to the sensor causes the sensor return signal to register near. This triggers the sensor to send a signal 74 to the actuation activation system indicating that the actuator 29 is unlocked. The actuation system auto-restow control logic responds as described below. Alternatively, though not preferred, the target and sensor may be arranged so that the sensor is set to normally near and the target is positioned in front of the sensor with the sensor triggering upon removal of the target.

Referring back to FIG. 5C, the actuator works on the principle of differential areas to generate extend and stow forces. The position of the piston 50 is controlled by use of pressurized hydraulic fluid being ported into the housing via an extend port 59 and a retract port 60. The extend port 59 connects to an extend cavity 61, and the retract port 60 connects to a stow cavity 62 via a transfer tube 63. The extend and stow cavities 61, 62 are located on opposite sides of the piston head 49 within the housing, and are separated by a number of head seals 64.

The extend cycle begins by entry of pressurized hydraulic fluid into both the extend and stow cavities 61, 62 via the extend and retract ports 59, 60, respectively. Hydraulic pressure builds in both cavities to work against the piston head seals 64 from both sides. Hydraulic pressure in the extend cavity 61 also works against the lock spring 54 and a number of distal lock sleeve seals 65. The pressure in the extend cavity 61 eventually becomes greater than the countering force provided by the lock spring 54. When this happens, the lock sleeve 51 moves in a manner that increases the volume of the extend cavity, i.e., to the left according to the arrangement of FIG. 5C. The sleeve 51 compresses the lock spring 54 and continues moving left until the sleeve encounters a stop 66. In so moving, the lock tooth 55, splined shaft 56, manual unlock lever 57, and target 46 rotate counter-clockwise. This results in the target covering the proximity sensor. The sensor is triggered by the nearness of the target. The activation actuation system interprets the trigger as indicating an unlocked actuator.

With the lock sleeve 51 retracted, the lock keys 52 are free to be moved radially outward. The lock keys are moved radially outward by the piston 50 as it moves to the right as a result of the hydraulic fluid pressure and a compression force provided by a piston spring 67. The position spring 67 so located in the extend cavity 61 and is positioned between a retainer 68 and the piston head 49. A piston follower 69 is provided between the piston spring 67 and the head to guide the head and to additionally hold the lock keys 52 out of their lock position when pressure is lessened in the extend cavity during the stow cycle.

Figure 6A:
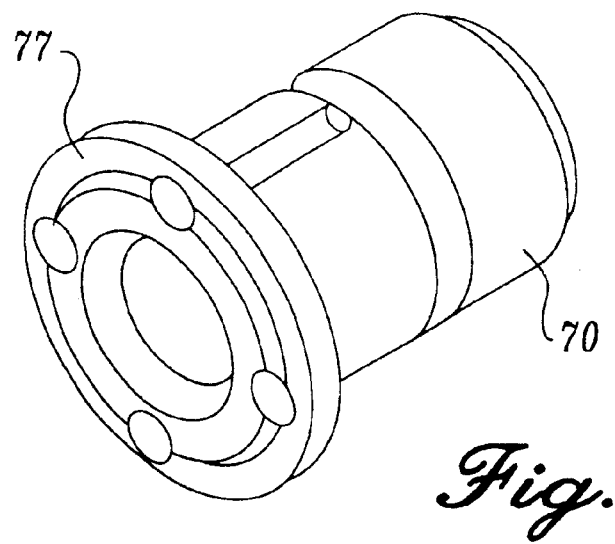
FIGS. 6A and 6B are perspective and side cross-section views of the lead screw shown in FIG. 5C.
Figure 6B:
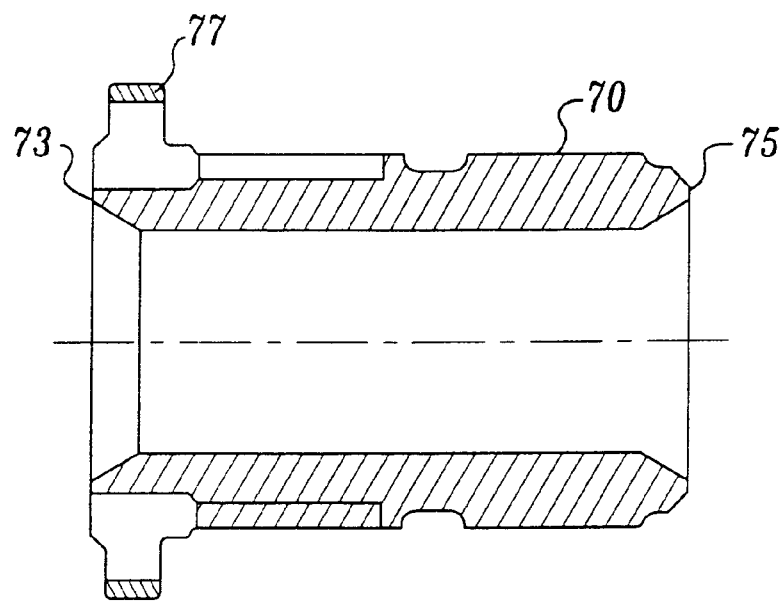
Figure 7A:
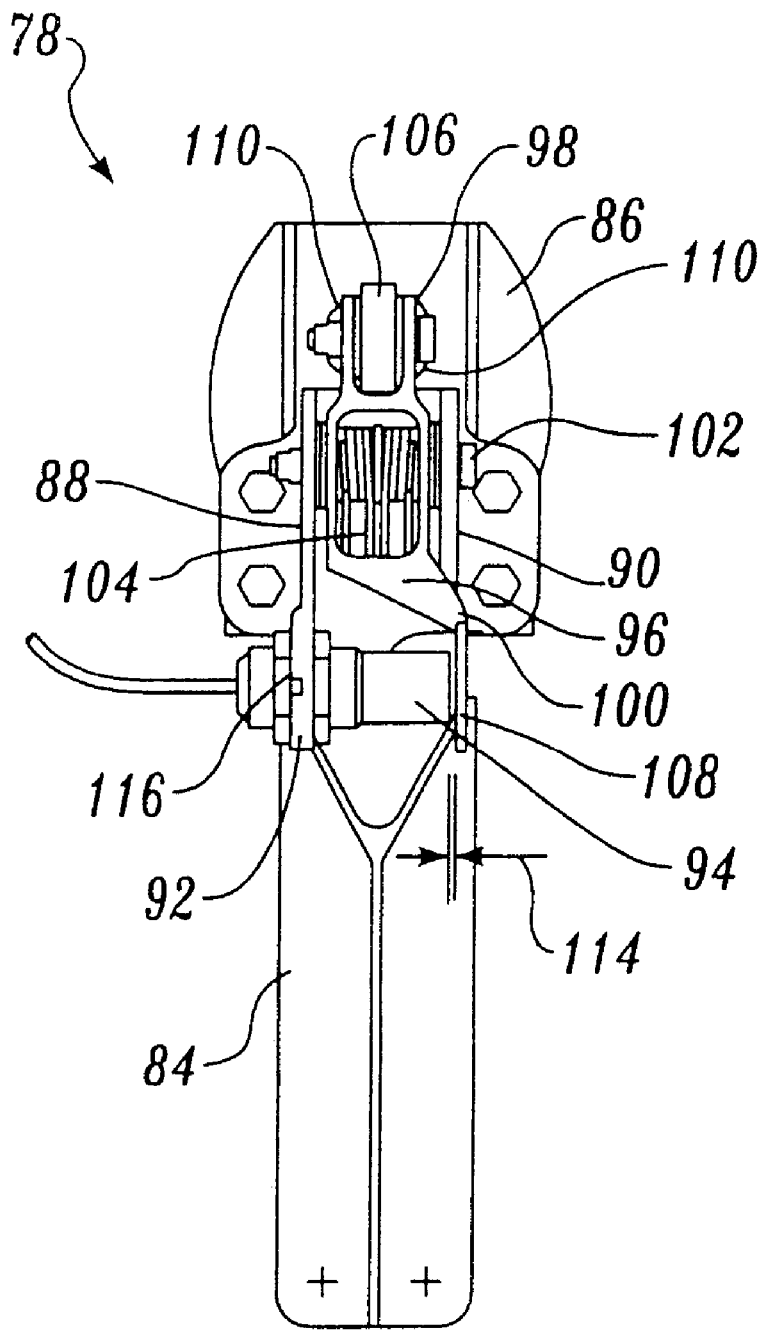
FIG. 7A is a front view of a sleeve sensor mechanism formed in accordance with the present invention, the view is taken forward of the torque box looking aft.

A lead screw nut 70 is attached to the piston head 49 via threads, with a retaining torque applied. An anti-rotation pin 71 and retaining ring 72 are also used to ensure that the lead screw nut will not rotate or become detached from the piston. As the piston (with the lead screw nut attached) moves linearly to the right without rotation, internal threads in the lead screw nut drive external threads of the lead screw 48, resulting in the rotation of the lead screw. Referring particularly to FIGS. 5D and 6A–6B, the lead screw nut 70 is generally cylindrical with first and second ends 73, 75. The first end 73 includes a shoulder 77 that extends radially outward. Assuming the actuator 29 is in a locked configuration, the shoulder 77 extends a distance sufficient to engage a lock key 52 and/or at least jam a portion of the piston head against a lock key in the event of a fractured piston head. This arrangement provides load redundancy to the piston component of the locking actuator.

The lead screw 48 is supported by two bearings 79 and is in communication with a worm wheel 81 via a key and slot. As the lead screw rotates, the worm wheel 81 also rotates. The worm wheel drives a worm gear 87. The rotation of the worm gear 87 is normal to that of the lead screw 48 and the worm wheel 81. The worm gear 87 is connected to a rotatable flexible shaft 89. When the worm gear 87 rotates, it causes the shaft 89 to rotate, which further allows the non-locking actuators to extend. In preferred embodiments, each thrust reverser system has two semicircular halves. Each half has three actuators, two of which do not lock. The locking actuator holds the non-locking actuators in place by the interconnecting shaft.

The stow cycle is initiated by increasing the relative pressure difference between the stow and extend cavities, e.g., by lessening pressure in the extend cavity 61 while maintaining pressure in the stow cavity 62. Pressure in the stow cavity 62 causes the piston 50 to translate linearly to the left which further causes the lead screw nut 70 to rotate the lead screw 48 in the direction opposite to that which it rotated while extending. This results in the worm wheel 81, the worm gear 87, and the flexible shaft 89 all rotating oppositely. The piston 50 pushes the follower 69 to the left, compressing the piston spring 67 against the retainer 68. When the lock keys 52 are over the slots 53 in the piston, the lock sleeve spring 54 moves the lock sleeve 51 to the right. This action drives the lock keys 52 radially inward to engage the piston head slots 53. The movement of the lock sleeve 51 also rotates the lock tooth 55, the splined shaft 56, the manual unlock lever 57, and the target 46 clockwise, away from the proximity sensor 45. This results in a target far condition, which is interpreted by the actuation system as meaning the actuator is locked.

FIGS. 7A–7D illustrate one embodiment of a sleeve sensor mechanism 78 formed in accordance with the present invention. The mechanism includes a backplate 86 mounted on the forward side of the torque box 30. Mounted to the backplate 86 is a housing 84 that includes forward-extending first and second parallel side support plates 88, 90. The first side support plate 88 includes a foot 92 for mounting a proximity sensor switch 94. The orientation of the proximity sensor 94 is substantially parallel to the general plane of the torque box 30 (i.e., transverse to the direction of motion of the translating sleeve.) The proximity sensor 94 is targeted to normally far.

The sleeve sensor mechanism 78 further includes an elongated target arm 96 having proximal and distal ends 98, 100. The target arm 96 is positioned between the side support plates 88, 90. Relative to the engine, the target arm proximal and distal ends 98, 100 extend generally radially outward from the engine centerline. The target arm 96 is rotatably connected to the housing side support plates 88, 90 using a conventional bushing arrangement 102. The axis of rotation is through the target arm at a middle region between the arm proximal and distal ends 98, 100. A torsional spring 104 is wound about the rotatable connection. The ends of the spring push between the housing 84 and portions of the target arm to urge the target arm distal end 100 in a forward direction.

The target arm proximal end 98 includes a roller 106 configured to rotate about an axis that is generally parallel to the plane of the torque box 30. The roller 106 accommodates motion between the target arm and the translating sleeve 14. A hole 110 extends through the back plate 86 and the torque box 30 at a position just aft of the target arm roller. The hole provides a window through which a plunger arm 82 forwardly extends. The plunger arm 82 is connected to the translating sleeve 14. The target arm distal end 100 includes a flat target plate 108.

Figure 7B:
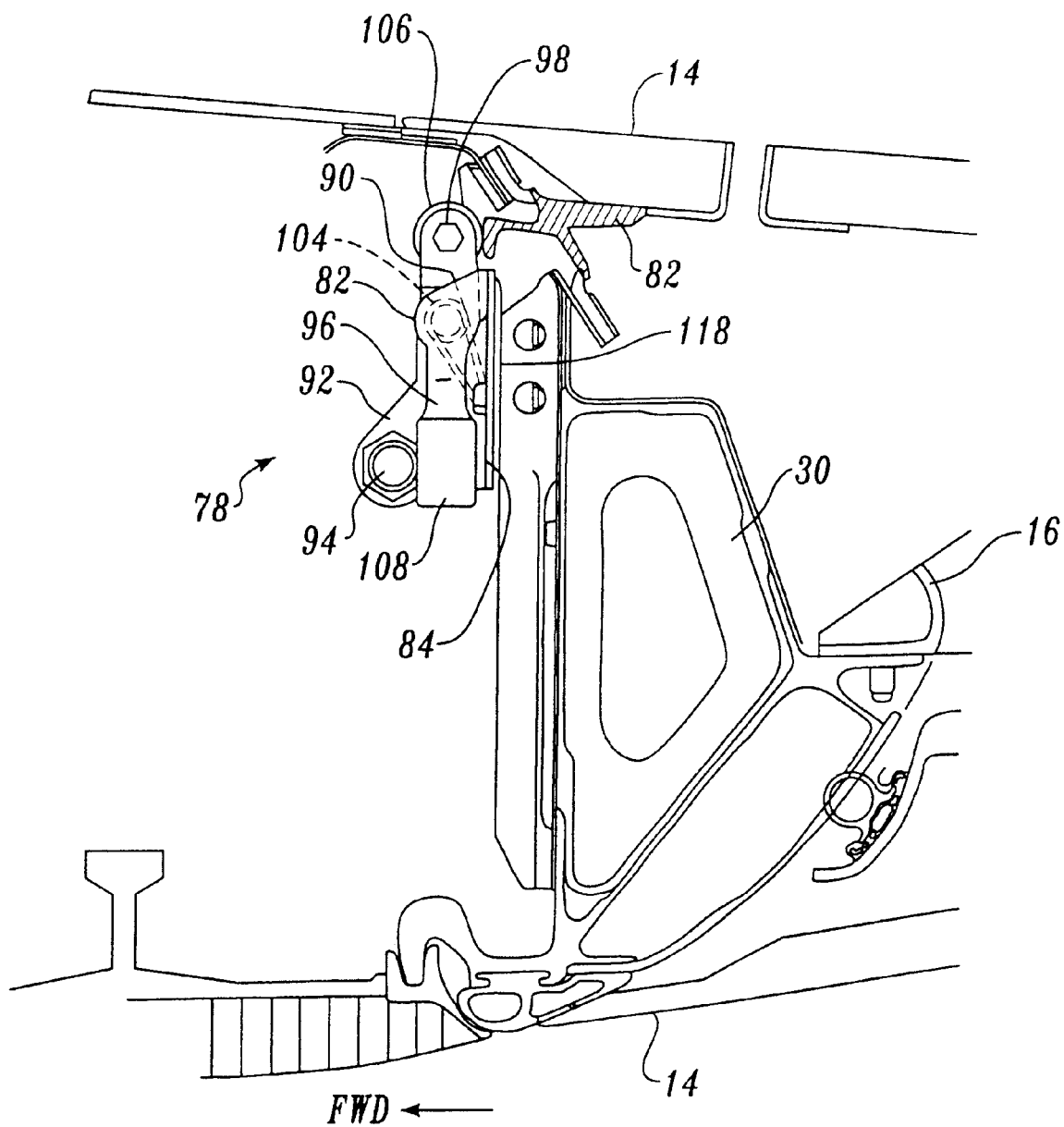
FIGS. 7B–7D are side views of the sleeve sensor mechanism of FIG. 7A with the translating sleeve located in a stowed position, a slightly translated aft position, and a significantly translated aft position, respectively.
Figure 8A:
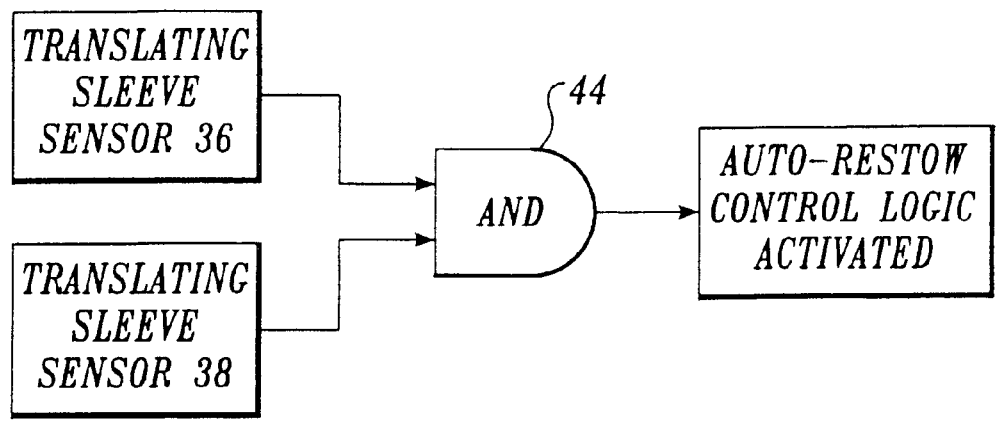
FIG. 8A is a diagram of a prior art auto-restow logic.

Referring to FIG. 7B, when the thrust reverser system is stowed, the translating sleeve 14 is positioned directly aft of the torque box 30. The plunger arm 82 extends through the hole 110 and pushes the roller 106 forward, causing the target arm 96 to rotate about its axis of rotation at the bushing arrangement 102. This causes the flat target plate 108 to rotate to its aftmost position near the torque box 30. In this position, the proximity sensor 94 does not sense the plate 108 and is thus not activated.

Figure 7C:
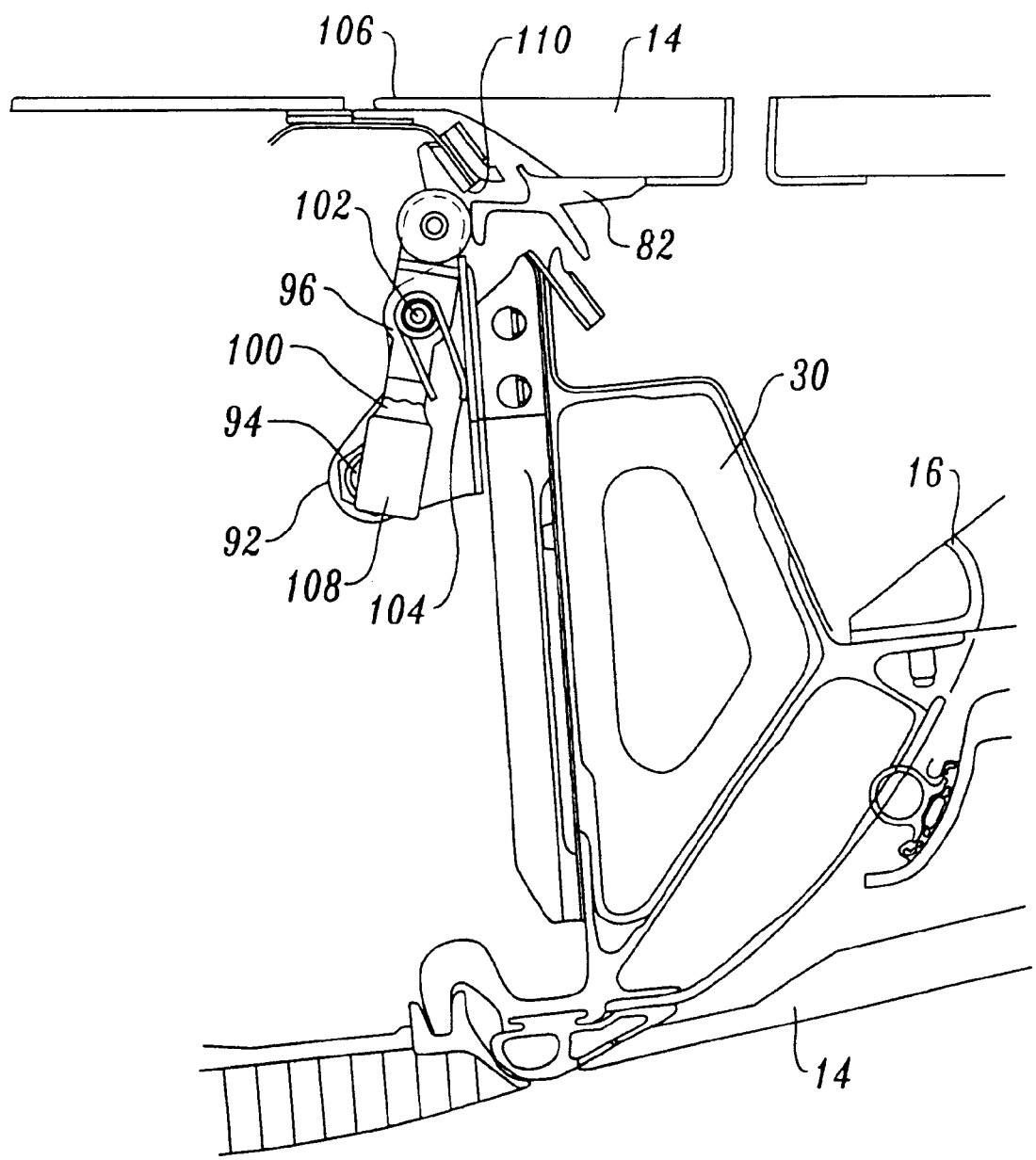
Figure 7D:
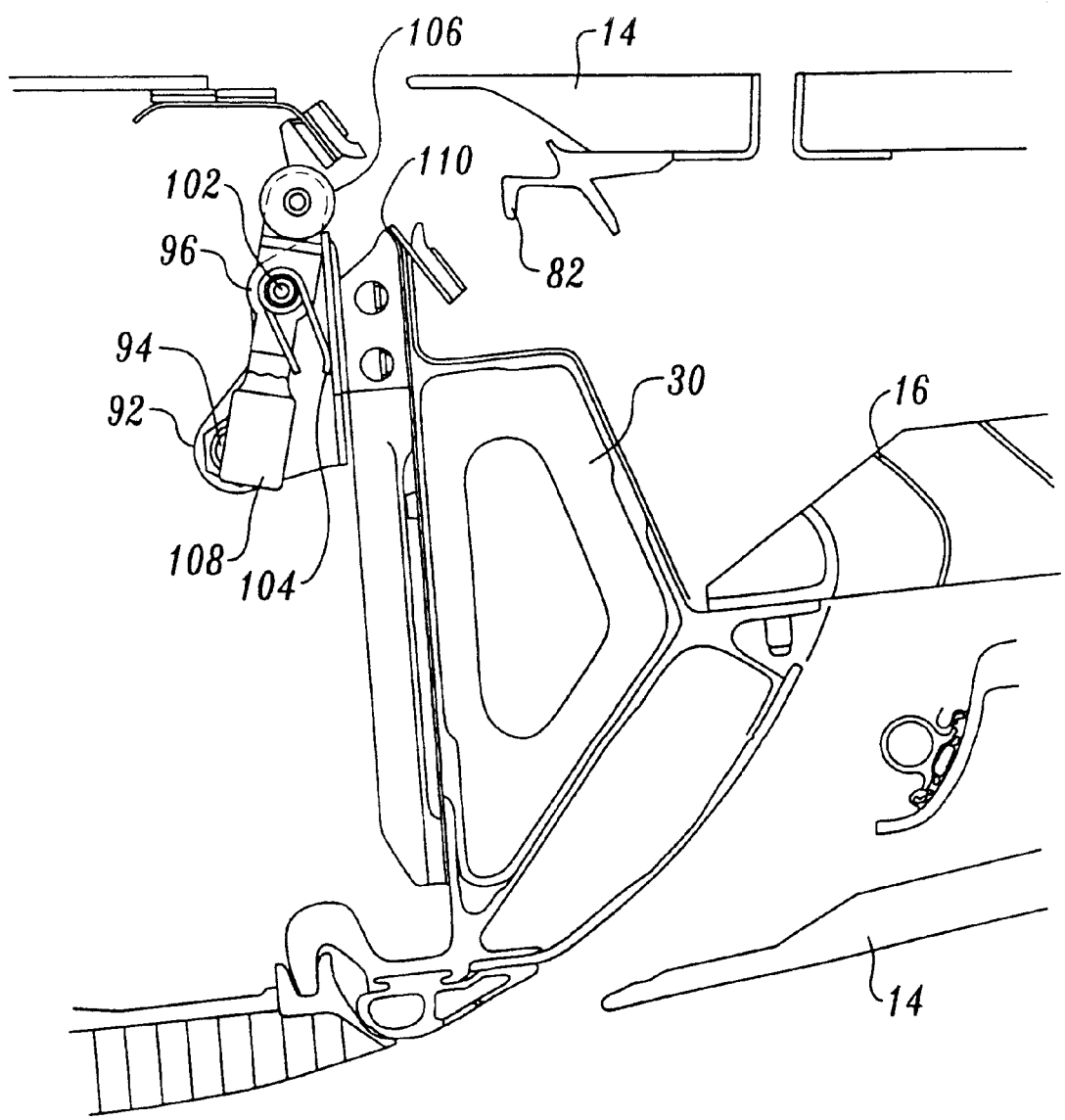

Referring to FIGS. 7C and 7D, when the translating sleeve 14 moves aft, the plunger 82 also moves aft. This allows the torsional spring 104 to rotate the target arm distal end 100 forward. In moving forward, the flat target plate 108 sufficiently covers the proximity sensor 94 and activates the sensor. In general, the distance to be traveled by the target arm will depend on a number of factors, including the type of sensors being used, the size of the target arm, the distance -between the arm and the sensor, etc. In one preferred embodiment, the sensor is activated after a translating sleeve has traveled a distance of about 0.635 cm (0.25 inches). Once activated, the sensor provides a trigger signal 112 to the actuation system auto-restow control logic. As will be appreciated from a reading of the above, the target arm can be used to amplify the distance traveled by the plunger and hence ensure the truthfulness of a sensor trigger.

As best seen from FIG. 7A, a slight gap 114 exists between the proximity sensor 94 and the target plate 108. This gap ensures that the plate 108 will not damage the sensor 94 when the plate moves in front of it, and that the return signal to the sensor will be definitively near. Adjustment of the gap 114 between the proximity sensor and the flat target plate is provided by jam nuts 116 integral to the sensor. Optional adjustment spacers or shims 118 may be used between the assembly housing 84 and the backplate 86 for adjusting the position of the target arm. Once set in the factory, little to no adjustment of the assembly or the gap is anticipated in service.

This type arrangement between a sensor and a plate is called a "slide-by" type because the plate "slides by" the sensor to trigger the sensor. Other types of sensors are available (e.g., "head on" sensors) and with appropriate modifications may be used with the present invention. What is important to the present invention is that the mechanism include a target and a sensor both located forward of fixed engine structure such as the fan cowl torque box. This aspect significantly improves worker access to the mechanism during repair and maintenance. In preferred embodiments, it is additionally important that the translating thrust reverser component include (or be in communication with) the triggering component, and that the sensor be normally set to far and triggering near.

Figure 8B:
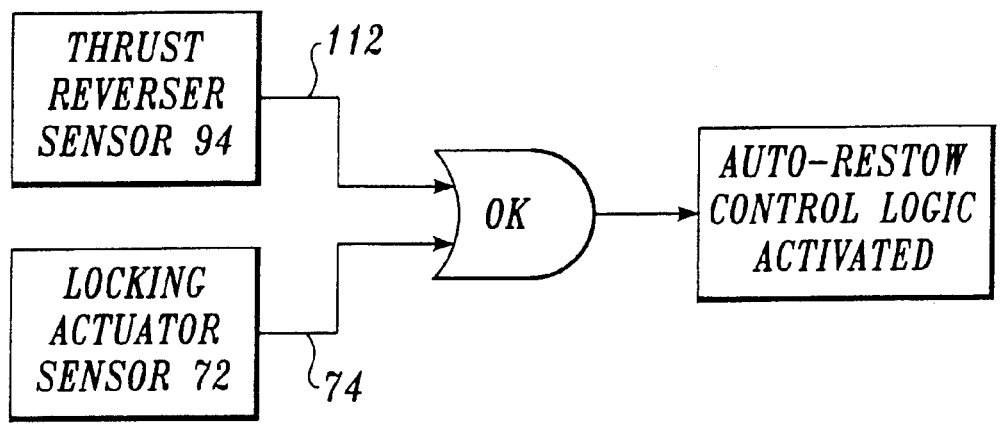
FIG. 8B is a diagram of auto-restow logic formed in accordance with the present invention.

As described in the Background section above, the known auto-restow logic is triggered upon receipt of signals from two sensors positioned aft of the torque box and pointing to targets on the translating sleeves 14. In contrast, the present invention will trigger upon receipt of either an actuator unlock trigger signal 74 or a sleeve sensor mechanism trigger signal 112. This is shown in FIG. 8B and is referred to as "OR" logic. Upon receipt of either signal 74, 112, the auto-restow logic immediately causes the thrust reversers to move to their stowed and locked position.

As will be appreciated from a reading of the above, the present invention is more tolerant of motion due to the setting of the sensors to a normally far condition with their triggers being in the normally near position. Only definite motion of the sleeve 14 toward a deployed position will activate the auto restow logic. The present invention is also much easier to maintain and to calibrate. The sleeve sensor mechanism is located forward of the torque box and is easily accessed with the fan cowls open. Adjustment of the sensor gap can be done directly without having to translate the sleeve.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In an actuation activation system for an aircraft engine having at least one actuator for use in translating an aircraft thrust reverser sleeve between stowed and extended positions, the at least one actuator having locked and unlocked states, the improvement comprising:
   (a) a first trigger signal produced when the at least one actuator is in its unlocked state;
   (b) a second trigger signal produced when the sleeve translates; and
   (c) auto-restow control system in communication with the first and second trigger signals, wherein receipt of either of the first and second trigger signals causes the actuation activation system to restow the thrust reverser sleeve.

2. The improvement according to claim 1, wherein the at least one actuator includes a lever having a locked position indicating that the actuator is locked and an unlocked position indicating that the actuator is unlocked; and the first trigger signal is produced by a first proximity sensor position near the lever and targeted to normally far, the sensor producing the first signal when triggered by the lever being in its unlocked position.

3. The improvement according to claim 1, wherein the aircraft engine includes a torque box and a translating sleeve positioned aft of the torque box; the improvement further including a sleeve sensor mechanism having a second proximity sensor positioned forward of the torque box and set to normally far and triggering near and a target in operable communication with the translating sleeve via a hole in the torque box; wherein movement of the sleeve causes the target to slide by the sensor, thus triggering the sensor.

4. The improvement according to claim 3, further including a plunger connected to the translating sleeve; wherein during a stowed condition the plunger extends through the hole in the torque box to position the target away from the second proximity sensor; and wherein aft movement of the translating sleeve and plunger causes the target to move in front of, and thus trigger, the proximity sensor.

5. An actuation system for use with an aircraft thrust reverser system having a translating sleeve with stowed and extended positions, the actuation system comprising:
   (a) at least one locking actuator for moving the translating sleeve between stowed and extended positions, the actuator including a lever corresponding to whether the actuator is locked or unlocked;
   (b) a first proximity sensor positioned near the lever and targeted to normally far and triggering upon receipt of a near return signal, wherein in an unlocked actuator position the lever is positioned in front of the first proximity sensor to cause the first proximity sensor switch to produce a first trigger signal;
   (c) a sleeve sensor mechanism including a second proximity sensor targeted to normally far and triggering upon receipt of a near return signal; and
   (d) an auto-restow control system in communication with the first and second proximity sensors switches and the rust reverser system moving components; wherein the auto-restow system causes the restowing of the translating sleeve upon receipt of a trigger signal from at least one of the first and second proximity sensors.

6. The actuation system according to claim 5, wherein the aircraft engine includes a torque box positioned generally forward of the translating sleeve, wherein the sleeve sensor mechanism further includes a target in operable communication with the translating sleeve via a hole in the torque box; movement of the sleeve causing the target to slide by the sensor, thus triggering the sensor.

7. The actuation system according to claim 5, wherein the sensor mechanism includes:
   (a) a target arm having a proximal end, a distal end, and a middle portion pivotably connected to a forward surface of the torque box; and
   (b) a proximity sensor connected to the torque box at a location near the target arm distal end, the sensor being set to normally far; wherein movement of the moving component causes one of the target arm proximal and distal ends to become positioned in front of the proximity sensor switch, causing the proximity sensor switch to produce a trigger signal.

8. The actuation system according to claim 7, further comprising a spring connected to the target arm at its middle portion pivotable connection to the torque box, wherein the spring is pre-loaded to urge the target arm distal end to rotate in front of the proximity sensor; and wherein a portion of the moving component urges the target arm to rotate in an opposite direction.

9. The actuation system according to claim 8, wherein the target arm middle portion is connected to the torque box using a pivot bolt; and wherein the spring is wound about the pivot bolt to push the target arm distal end away from the fixed structure.

* * * * *